United States Patent [19]

Fiala

[11] 4,385,604

[45] May 31, 1983

[54] METHOD AND DEVICE FOR OPERATION OF AN INTERNAL COMBUSTION ENGINE IN PARTICULAR FOR A VEHICLE

[75] Inventor: Ernst Fiala, Wolfsburg, Fed. Rep. of Germany

[73] Assignee: Volkswagenwerk Aktiengesellschaft, Fed. Rep. of Germany

[21] Appl. No.: 163,494

[22] Filed: Jun. 27, 1980

[30] Foreign Application Priority Data

Jun. 28, 1979 [DE] Fed. Rep. of Germany ....... 2926024

[51] Int. Cl.³ .......................................... F02D 11/08
[52] U.S. Cl. .................................... 123/340; 123/351; 123/360; 123/399; 123/400; 123/401; 123/396; 123/363; 123/389; 123/352
[58] Field of Search .............. 123/399, 361, 340, 389, 123/352, 360, 400, 401; 74/866

[56] References Cited

U.S. PATENT DOCUMENTS

| | | | |
|---|---|---|---|
| 3,916,854 | 11/1975 | Barton | 123/363 |
| 4,112,885 | 9/1978 | Iwata | 123/361 |
| 4,168,679 | 9/1979 | Ikeura | 123/399 |
| 4,305,359 | 12/1981 | Mann | 123/399 |
| 4,335,689 | 6/1982 | Abe | 123/399 |
| 4,342,299 | 8/1982 | Haka | 123/401 |

Primary Examiner—Ronald B. Cox
Attorney, Agent, or Firm—Brumbaugh, Graves, Donohue & Raymond

[57] ABSTRACT

Controls are provided to directly or indirectly avoid operation of the internal combustion engine of a motor vehicle in a range of speed and output power which is detrimental to engine efficiency. The controls become operative upon attainment of a predetermined limit value for engine parameters.

25 Claims, 23 Drawing Figures

METHOD AND DEVICE FOR OPERATION OF AN INTERNAL COMBUSTION ENGINE IN PARTICULAR FOR A VEHICLE

BACKGROUND OF THE INVENTION

This invention relates to methods and apparatus for controlling the operation of an internal combustion engine, in particular an engine used for a motor vehicle.

In order to operate a motor vehicle internal combustion engine with minimum energy consumption, the engine must be operated in a range of engine rotational speeds and loads which are favorable for fuel consumption. Thus the operating points of the engine, where the fuel consumption is substantially higher than necessary to accommodate the output load must be avoided.

The apparatus described in U.S. Pat. No. 3,916,854 to Barton describes an arrangement wherein a gas pedal for motor vehicle is connected to a throttle by a control apparatus, which is operated in connection with an engine speed sensor. By sensing the rotational speed of the engine, and by the use of a cam and cam follower or electronic storage and computing means, the throttle opening is allowed to reach only a specific position at each speed corresponding to the most efficient operating condition for the engine rotation speed and load demanded. These positions for the different speeds are stored in the cam or electronic storage means and define a predetermined curve in the power-speed-diagram of the engine. When the operator actuates the gas pedal, an adjustment of the throttle takes place in accordance with the actual rotational speed of the engine. For each rotational speed the output associated with that speed according to the predetermined curve is obtained by a suitable adjustment of the throttle. The output and speed of the engine thus become greater as the operating point of the engine moves along the predetermined curve, until finally the setting of the throttle is reached which corresponds to the position of the gas pedal. Then the operating point travels along the line of constant throttle setting to its intersection with a line of resistance to motion (road resistance), that is, it leaves the preassigned curve. The final setting of the throttle is thus determined by positioning the gas pedal, and ultimately reached along the preassigned curve by automatic adjustment.

It is an object of the present invention to provide a method for operating an internal combustion engine an a device for practicing that method to preclude operating points of the engine in the power output-rotational speed diagram which are disadvantageous in terms of fuel consumption.

SUMMARY OF THE INVENTION

In accordance with the present invention there is provided a method for operating an internal combustion engine having an adjustable fuel proportioning device and having variable power output and variable rotational speed, to avoid operating at engine speeds and output powers corresponding to high fuel consumption. The method consists of the steps of selecting a value of maximum speed for each value of engine output power, the selected values corresponding to greater speed than the values for maximum power output at selected fuel consumption. The second step is monitoring the output power and the rotational speed of the engine and adjusting the fuel proportioning means to increase engine output power when the engine speed is greater than the selected value for the actual output power of the engine.

There are two means of carrying out the method, the first being to provide a signal to the operator when the engine is operating at excessive rotational speeds. The second is to provide an automatic adjustment of the throttle setting when this condition is reached.

In accordance with the invention there is provided an apparatus for controlling the operation of an internal combustion engine having an adjustable fuel proportioning device and having variable output power and variable rotational speed in order to avoid operation at engine speeds and output powers corresponding to high fuel consumption by adjusting the fuel proportioning means to increase engine output power when engine speed is greater than a predetermine value of engine speed for the current output power of the engine. The apparatus comprises means for sensing at least one engine characteristic representative of at least one operating parameter from the group consisting of output power and rotational speed. There are also provided control means responsive to the output of the sensor for providing an output when the speed is greater than the predetermined value for the current output power of the engine, and output means responsive to the control means output for causing adjustment of the fuel proportioning means.

The present invention is distinguished from the prior patent to Barton in that according to the present invention, control of the operating conditions of the engine, or signaling of the vehicle operator, takes place only when the operator has selected an operating point for engine rotational speed and output power which is disadvantageous from the point of view of engine efficiency. At this point the operator may be given a signal indicating the desirability of shifting into the next higher gear of a transmission to reduce engine speed, or there may be a direct adjustment of the fuel proportioning means toward an increased fuel supply, so that the engine operating point will once more lie in a range of greater efficiency.

For better understanding of the present invention, together with other and further objects, reference is made to the following description, taken in conjunction with the accompanying drawings, and its scope will be pointed out in the appended claims.

DESCRIPTION OF THE INVENTION

Figure 1:
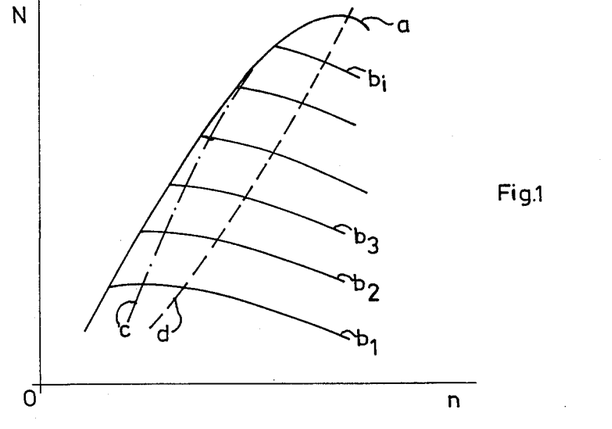
FIG. 1 is a graph indicating engine output as a function of engine speed for various engine operating conditions.

FIG. 1 is a graph illustrating the operating characteristics of an internal combustion engine of the type used in a motor vehicle. The curves plotted illustrate the relation of engine output N to engine rotational speed n. Curve a, which is plotted on the graph of FIG. 1 is representative of maximum engine output for each rotational speed, and thus representative of the operating curve of the engine under full throttle. Curves $b_1$, $b_2$, $b_3$ through $b_i$ are curves of equal fuel consumption, for example in liters per hour. Curve c is a line representing the maximum engine output for each value of fuel consumption. Curve d is a preassigned selected curve, which is selected in accordance with the present invention to define a region of operating characteristics, on the right of curve d, which are to be avoided because operation in these operating ranges of engine rotational speed and output power are wasteful of fuel since the amount of engine output can be achieved with lower fuel consumption at operating points to the left of curve d. According to one aspect of the invention operating points located to the right of curve d in FIG. 1 are avoided by further opening the control device of the engine, such as the throttle or the control rod of a fuel injection pump, when the preassigned curve d, representing engine speed and output power is reached. It will be noted that curve d is to the right, corresponding to higher rotational speed of the optimum curve c, and serves as a limiting range of engine operation with higher rotational speeds to be avoided. Control of engine operation to avoid operating ranges to the right of curve d may be achieved directly by a servo mechanism which operates the fuel proportioning device, such as the throttle or fuel injection pump, and causes an increase in the quantity of fuel being supplied to the engine to thereby increase the engine output along curve d. Avoiding operation to the right of curve d may also be achieved indirectly by signaling the operator of the vehicle that it would be advantageous for him to increase his foot pressure on the gas pedal or shift into the next higher gear to avoid excess engine rotational speeds to the right of curve d.

Figure 2:
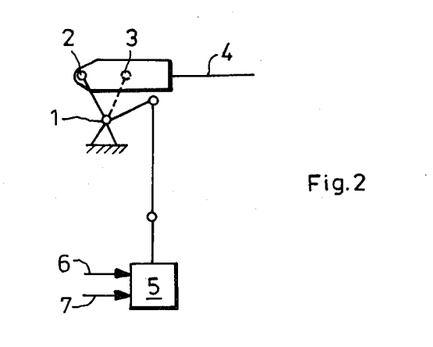
FIG. 2 is a block diagram illustrating an apparatus in accordance with the present invention.

FIG. 2 illustrates in a general sense a mechanism in accordance with the present invention. A throttle flap of a carburetor is pivoted at pivot 1 and connected by linkage 2 to a rod or cable 4 which leads to the vehicle's gas pedal. A servo mechanism 5 is provided which responds to suitable engine operating parameters 6 and 7 which reflect the actual operating condition of the engine. Servo motor 5 includes a control which causes the opening of the fuel proportioning means or the throttle flap pivoted at 1 to avoid operation to the right of preassigned curve d. Thus servo motor 5 can serve to operate the throttle flap pivoted at 1 to obtain the throttle condition which will prevent engine operating to the right of curve d in FIG. 1. When the servo mechanism detects that curve d is being exceeded, then the throttle flap is opened further to increase engine output. Suitable parameters 6 and 7 provided to the control device may be, for example, the setting of the fuel proportioning throttle flap, the setting of the gas pedal, the intake duct vacuum pressure, the exhaust gas temperature, or the engine rotational speed.

Figure 3:
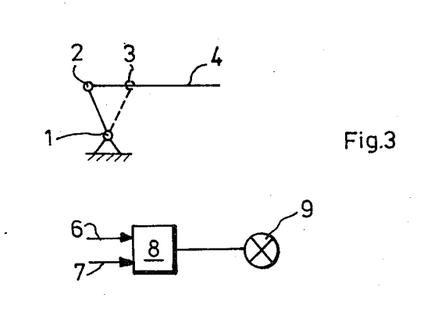
FIG. 3 is a block diagram illustrating an alternate apparatus in accordance with the present invention.

FIG. 3 illustrates apparatus for providing indirect control of the operating conditions of the vehicle. In the FIG. 3 embodiment there is provided a computer 8 which triggers a signaling device 9, for example, a light on the dash board, or an acoustical buzzer, when the engine is operating in the undesired zones. In this case the operator can be signaled to increase pressure on the gas pedal to open the throttle pivoted at 1 by actuationg of the cable 4, or the operator can be signaled to shift the transmission of the vehicle into a higher operating speed.

The course of operation of the vehicle is the same whether the direct servo mechanism arrangement of FIG. 2 or the indirect arrangements of FIG. 3 are used. When at the output desired by the operator, the rotational speed of the engine increases up to the preassigned curve d, shown in FIG. 1, the signal device 9 prompts the operator to either shift to a higher gear, or prompts the servo motor 5 to open the fuel proportioning means wider, likewise prompting to the driver to shift to a higher gear or accept the increased output with better fuel economy. It may be desirable to give the operator a signal, and at the same time open the fuel proportioning means by way of servo motor 5.

Figure 4:
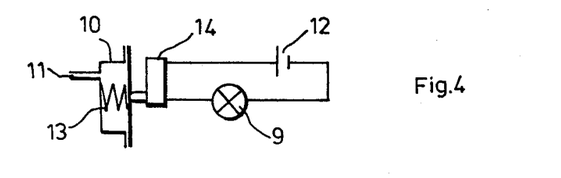
FIG. 4 is a diagram illustrating an intake vacuum pressure operated apparatus in accordance with the present invention.
Figure 5:
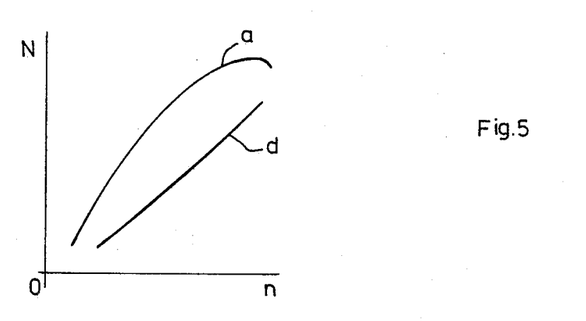
FIG. 5 is a graph illustrating the operating characteristics of the FIG. 4 device.

FIG. 4 shows a mechanical device for achieving engine operation according to the method of the present invention for a gasoline engine. The device includes a negative pressure chamber 10, which is acted upon by the intake manifold vacuum. A flexible wall of the vacuum chamber 10 responds to the negative pressure and acts against an internal spring 13. Upon the attainment of a selected vacuum, switch 14 closes a circuit including a source of current 12 and a signal indication 9. When the intake duct pressure drops to approximately 0.7 bar, the outside air pressure compresses spring 13 to the extent that switch 14 closes and actuates the signal device. Thus by use of the apparatus shown in FIG. 4 the preassigned curve d in the output-speed diagram is the curve shown in FIG. 5, which corresponds to approximately constant intake manifold pressure. This curve has the disadvantage that it is comparitively close to the maximum output (curve a) at low speed, but comparitively far from the curve of maximum output at high speeds.

Figure 6:
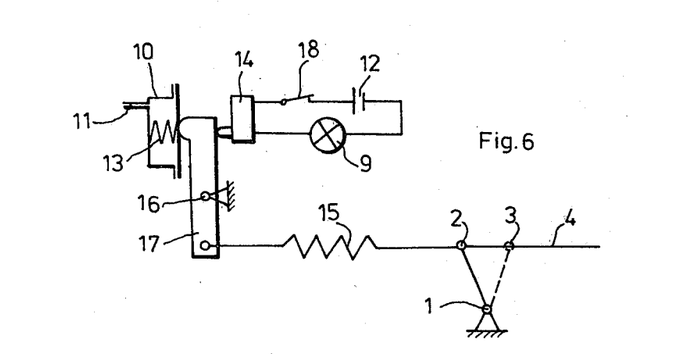
FIG. 6 is an illustration of a vacuum and accelerator operated apparatus in accordance with the present invention.
Figure 7:
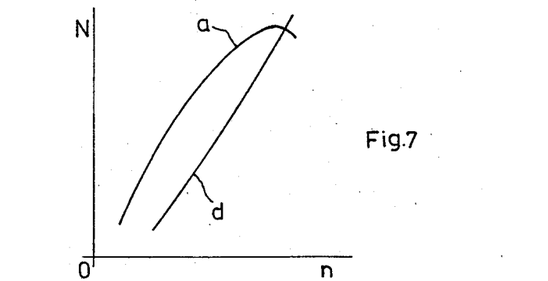
FIG. 7 is a graph illustrating the operating characteristics of the FIG. 6 device.

The device illustrated in FIG. 6 is an improved arrangement. In this device, the switch 14 is acted upon not only by the intake duct suction in chamber 11, but also by the setting of the control of the fuel proportioning means, such as the throttle, by way of spring 15 and lever 17 which is pivoted at 16. The closer the control is to the full load setting 3, the lower the rotational speed at which the switch 14 will act. The preassigned curve d for this device is shown in FIG. 7. In the FIG. 6 embodiment there is also provided a switch 18, which opens when the transmission is in its highest gear, thereby surpressing signaling of the driver when the transmission is in its highest gear, a point at which such signaling would be meaningless.

Figure 8:
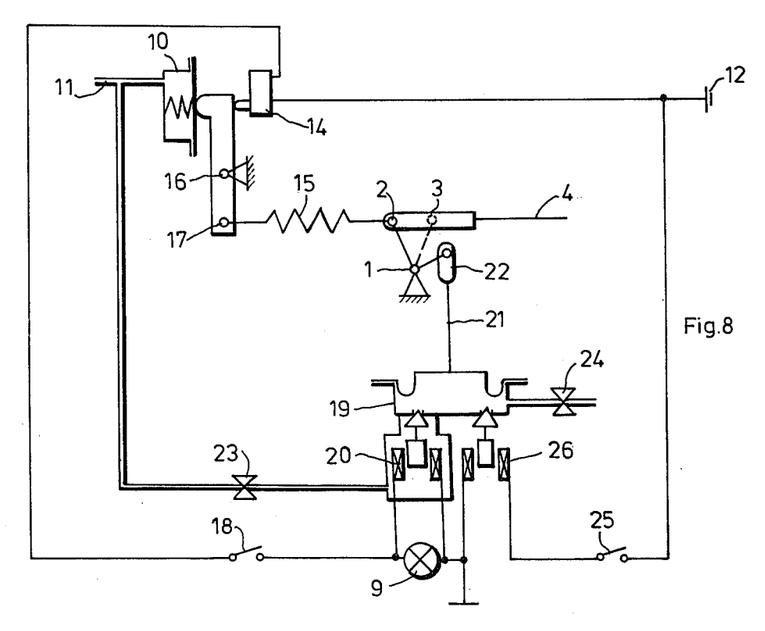
FIG. 8 is a diagram of a throttle operating apparatus in accordance with the present invention.

FIG. 8 shows an arrangement with additional direct action on the control of the throttle by use of servo motor 19. Servo motor 19 consists of a vacuum chamber with a flexible wall connected by way of an electromagnetic valve 20 to the intake manifold of the engine. The action of chamber 10 and spring 15 on switch 14 has the same characteristic, illustrated in FIG. 7, for the device of FIG. 6.

When electromagnetic valve 20 is opened upon the closing of switch 14 in the FIG. 8 device, the servo motor 19 pulls the control linkage, pivoted at 1 toward the full load setting 3 by means of rod 21 having an oblong hole 22. Throttles 23 and 24 control the dynamic operation of servo motor 19. Switch 25 closes when the gas pedal is in the idling position causing valve 26 to open, rapidly venting the vacuum chamber 19 and allowing the control to return to its idling position shown at 2. For the duration of acceleration at high intake duct pressure, the device is inoperative. When the engine speed increases and the intake pressures falls, switch 14 closes, signaling means 9 is actuated, provided switch 18 is closed (the top gear not being engaged) and valve 20 opens connecting servo motor 19 to the intake manifold vacuum by passage 11. Servo motor 19 shifts the control linkage towards the full throttle position 3. When this happens either the vehicle will accelerate along curve d with comparably favorable fuel consumption, or the driver must let up on the accelerator bringing the pedal into the idle position, opening valve 26 to vent servo motor 19.

Figure 9:
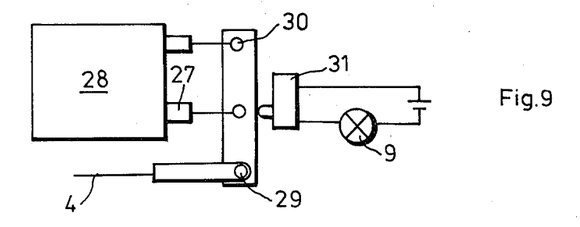
FIG. 9 is a diagram of an apparatus in accordance with the present invention responsive to the setting of a fuel injection pump.

In diesel engines the intake suction is not available. One possible parameter to be used for control is the setting of the control rod 27 of the fuel injection pump 28, which is shown in FIG. 9. The accelerator pedal acts at 29 and the pump governor at 30. Switch 31 closes when the quantity injected per stroke falls below approximately 80% of maximum. Switch 31 performs the function of switch 14 shown in FIGS. 4, 6 and 8. Another possible control parameter in a diesel engine is the exhaust gas temperature. If the temperature drops below approximately 650° C. and the gas pedal is not in the idling position, the signal means is triggered or the control of the fuel proportioning means moves toward full load. Operation along any desired curve d is readily obtained with the aid of a computer such as a microprocessor. The device may serve at the same time to provide an indication of consumption, since in the relatively narrow useable output interval, the consumption in liters per hundred kilometers definitely varies with one of the parameters sampled, for example, the intake suction in a gasoline engine.

Figure 10:
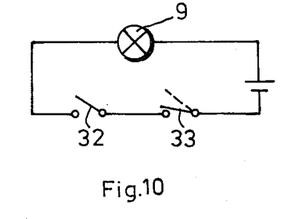
FIG. 10 is a schematic diagram of a signaling apparatus in accordance with the present invention.
Figure 11:
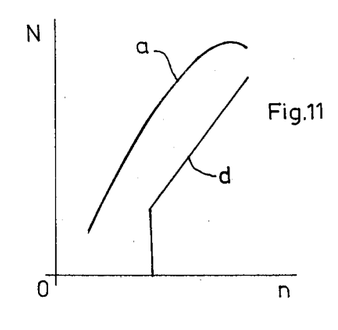
FIG. 11 is a graph showing the operating characteristics of the FIG. 10 device.

An alternative for diesel engine is shown in FIGS. 10 and 11. In FIG. 10 there is shown a circuit containing the signaling means 9 which is closed by switch 32 when the engine rotational speed exceeds about 2,000 rpm, for example by way of a relay energized by a governor. The switch 33 opens when the gas pedal, or injection control setting, is above about three-quarters of full load. As a result an operating points to the right of the preassigned curve d, shown in FIG. 11, the circuit of FIG. 10 is closed and the signal means 9 is triggered, or in the alternative the injection quantity of the fuel injector is increased.

By modification, the device of FIGS. 2 and 8 may be incorporated in a speed governor system. In top gear, switch 18 is opened, as shown in FIG. 8. The valve 20 is then triggered when the speed drops below a selected level, this activates servo motor 19 to open the throttle. If the driver takes his foot off the gas pedal, switch 25 closes, and valve 26 opens. The engine will idle until the operator steps on the gas.

Figure 12:
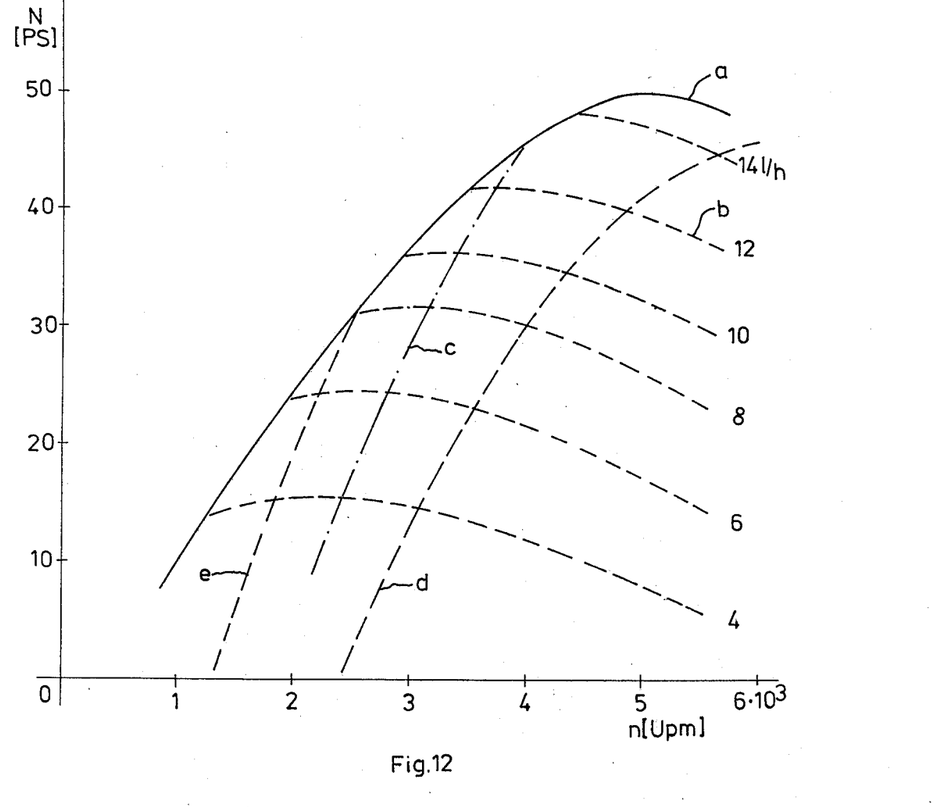
FIG. 12 is a graph illustrating engine output power as a function of engine rotational speed with a preferred range of engine operation.

FIG. 12 shows the engine output versus rotational speed diagram of an inernal combustion engine. Because of the finite number of transmission speeds, operating points on the optimum curve c can be matched only approximately. Assuming that the engine speed is approximately 50% less in the next highest gear of the transmission, then preassigned curves d and e, on opposite sides of curve c are obtained as the limits within which the engine must operate at various transmission gear positions. If an operating point of any output lies to the right of curve d, the same output can be obtained with less consumption by shifting to the next highest gear. Curve e is separated in rotational speed below curve c at a separation corresponding to the separation of curve a above curve c. If an operating point lies at a rotational speed below curve e, a more favorable consumption can be obtained by downshifting. Curve e is somewhat closer to curve c because operation in higher engine speeds is given preference, since they provide the driver with a wider output range using the accelerator only. Curves d and e thus define a preferred operating range of the engine.

Figure 13:
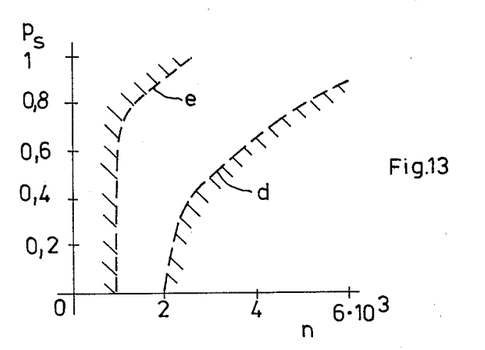
FIG. 13 is a graph illustrating intake vacuum pressure as a function of engine rotational speed, with a desired range of engine operation.
Figure 14:
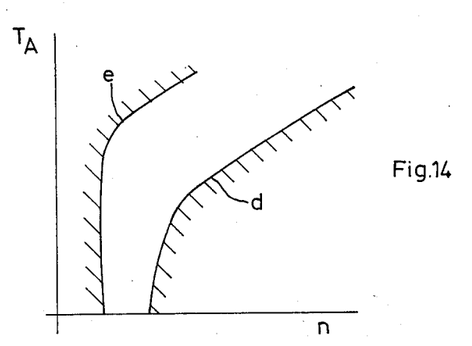
FIG. 14 is a graph illustrating engine exhaust temperature as a function of engine operating speed with a preferred range of engine operation.

In this case, instead of measuring the characteristic of engine power output which is difficult to measure, we are sensing characteristics having a definite relationship to the power output parameter at each rotational speed and more easily measured. In the case of gasoline engines, for example, the intake vacuum pressure $P_s$ can be used to achieve the operating range shown in FIG. 13. In the case of a diesel engine, the exhaust gas temperature $T_A$ in FIG. 14 for various operating conditions of the engine can be used as the engine characteristic to be sensed. Other operating characteristics, such as throttle setting, injection control settings, current in the case of electric motors may also be used. In FIGS. 13 and 14, the operating points of optimum consumption lie between curves d and e.

Figure 15:
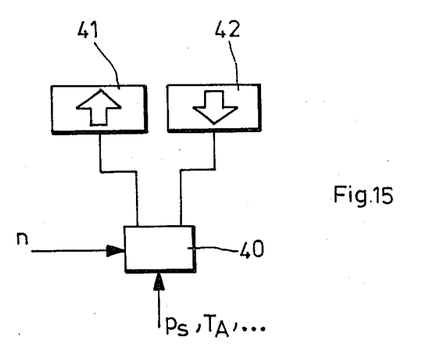
FIG. 15 illustrates a signaling apparatus in accordance with the present invention.
Figure 16:
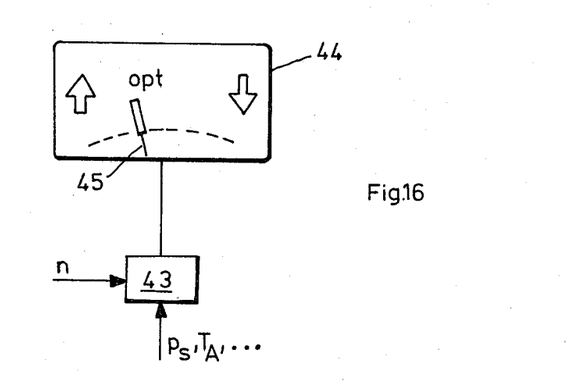
FIG. 16 illustrates an alternate signaling apparatus in accordance with the invention.

A possible signaling means to obtain an indication for the driver in a system having minimum (e) and maximum (d) engine rotational speed curves is shown in FIG. 15. A computer or microprocessor 40 is used, and is supplied with signals representing the parameter of engine speed and a sensed engine characteristic corresponding to the parameter of engine power output, for example, intake suction. The computer checks whether these quantities lie between preselected curves d and e. If the quantities lie to the right of curve d, an output signal is provided to output means comprising indicator 41, prompting the driver to change to a higher gear. If the operating parameters are to the left of curve e, an output signal is provided to indicator 42 signaling the driver that it is appropriate to downshift the transmission. Another form of signaling means is shown in FIG. 16 embodiment wherein the computer 43 receives signals for engine speed n and a quantity corresponding to output, such as intake manifold pressure $P_s$ or exhaust temperature, $T_A$. It compares these quantities with a stored graph of the quantities for a minimum consumption, namely line c in FIG. 12. If they coincide, the pointer 45 on indicating instrument 44 points to optimum or "OPT." If the engine speed n and output quantity $P_s$, $T_A$, etc. is near curve d, the pointer approaches the left-hand symbol indicating an upward change in gear speed. The indicator reaches this symbol approximately when the operating point is at the preassigned curve d. It reaches a right-hand symbol, indicating a downshift, when the operating point nears or passes curve e. In that case, the driver not only receives guidance on how to shift, but may also operate at minimum consumption or maximum output, without shifting by feeding gas accordingly.

The operating point defined by $P_s$, $T_A$, on the one hand, and rotational speed n on the other hand, is definitely associated with fuel consumption in liters per hour. This can be indicated on the indicating instrument 44 shown in FIG. 16.

Figure 17:
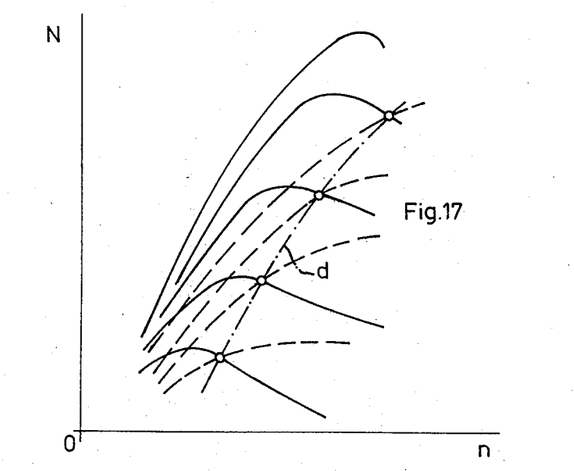
FIG. 17 is a graph illustrating engine output power as a function of engine rotational speed illustrating the operating characteristics of an engine with a control device in accordance with the present invention.
Figure 18:
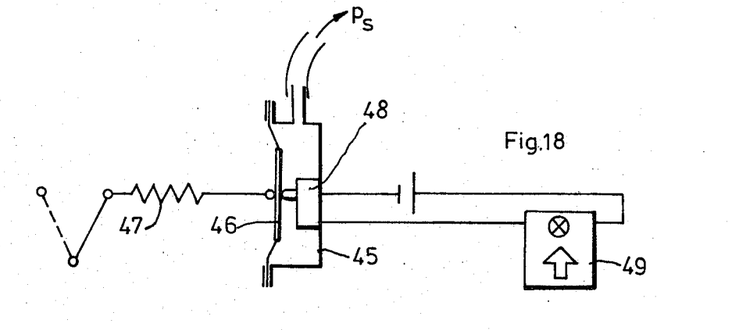
FIG. 18 is an illustration of a device having the operating characteristics illustrated in FIG. 17.

FIG. 17 shows an engine output to rotational speed diagram which includes solid curves of like throttle setting. There are also curves of like intake pressure, drawn dotted. The dot-dash curve d is the preassigned curve at which the transmission gear speed is to be changed up for reasons of consumption. This curve d defines various values of intake suction and throttle setting in pairs. The need to change up is to be indicated to the driver by a telltail light. The device proposed for this practice is shown in FIG. 18. The negative pressure chamber 45 is closed off on the left by a membrane 46 with spring-like restorative characteristics. Membrane 46 is acted upon to the right by the intake suction $P_s$ and to the left by tension spring 47. The tension of spring 47 varies with throttle setting. In the drawing the setting for full load is represented by solid lines. If the intake suction $P_s$ perdominates, the membrane 46 will move to the right actuating switch 48. this will cause lamp 49 with the up shift symbol to be operated. As FIG. 18 indicates, the cooperation of spring 47 with the intake suction provides an upshift indication through indicator 49, prompting the driver to shift to the next highest gear.

Figure 19:
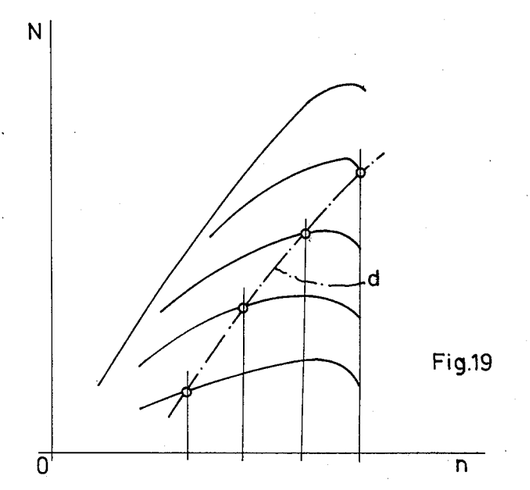
FIG. 19 is a graph illustrating engine output power as a function of engine rotational speed illustrating the operating characteristics of an engine with another control device in accordance with the present invention.
Figure 20:
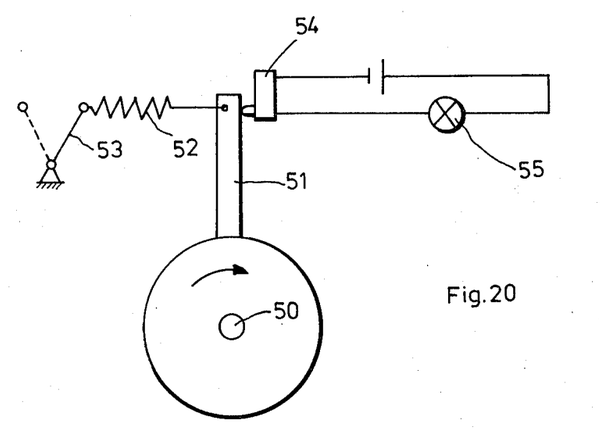
FIG. 20 is an illustration of a device having the operating characteristics illustrated in FIG. 19.

FIG. 19 shows an engine output to rotational speed diagram for a diesel engine. The solid lines are curves of equal governor, or gas pressure settings. The dot-dash line d is the curve at which the change to the next highest gear should take place. FIG. 20 shows the corresponding device. Lever 51, pivoted at 50, is swung clockwise by a magnetic field rotating at the engine speed n, against the action of spring 52. The tension of spring 52 is varied by the governor setting, by way of linkage 53. Depending on governor setting (idling position in solid lines), and engine speed, switch 54 is actuated by lever 51 and lights up the lamp 55 as signal to shift to a higher transmission gear.

Figure 21:
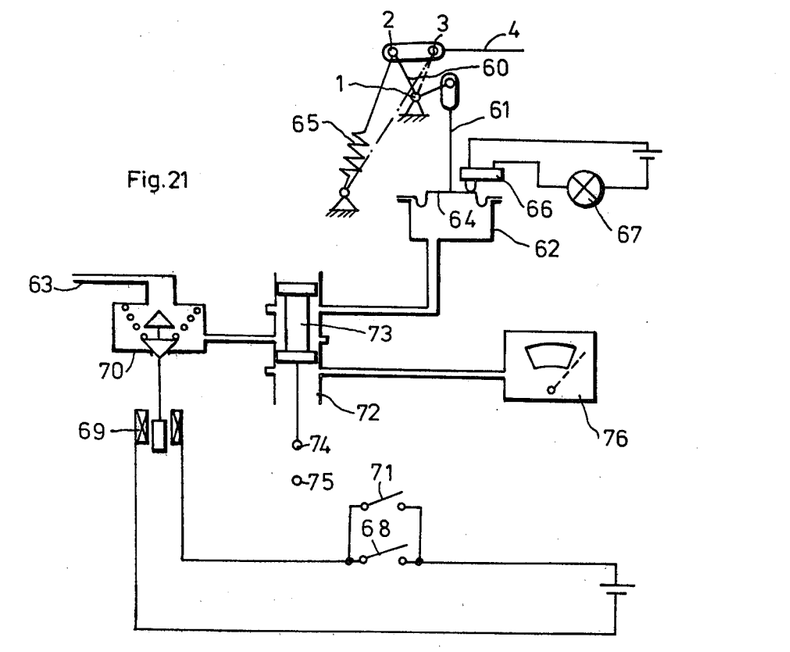
FIG. 21 shows another embodiment of the present invention having an electromechanical pneumatic switch.

Another arrangement according to the invention is illustrated in FIG. 21. The throttle is pivoted at 1 with the idling position shown solid as 2, and the full load position shown dotted as 3. The throttle is actuated as is customary by a cable 4 leading to the gas pedal. Also there is provided a lever 60 which connects the throttle to the piston rod 61 of a servo motor in the form of a negative pressure chamber 62. The pressure chamber is acted upon by the intake manifold suction from line 63 in the initial position. If the intake manifold pressure drops below a certain level, for example, 0.75 bar, the piston 64 pulls the throttle towards full load by rod 61. Thus the intake pressure rises, providing a closed control circuit. The opposing spring 65 acts digressively, the farther the throttle is opened, the higher the resulting intake pressure required. If the piston 64 moves downward, switch 66 closes, and turns on the signal means 67, notifying the driver to upshift. If the driver takes his foot off the gas pedal, he closes switch 68 causing magnet 69 to switch the negative pressure switch 70, connecting the pressure chamber 62 to the atmosphere and thus putting the throttle into idling position 2. The same is accomplished by switch 71, in effect shutting off the system. The negative pressure switch 72, operative in top gear, switches the suction 63 to the consumption indicator 76. Piston 73 being drawn out of the illustrated 74 position into position 75 by the gear shift into the highest gear speed. The indication of suction is quite feasible in top gear, because there is a close correlation between intake suction and fuel consumption in liters per 100 kilometers.

Figure 22:
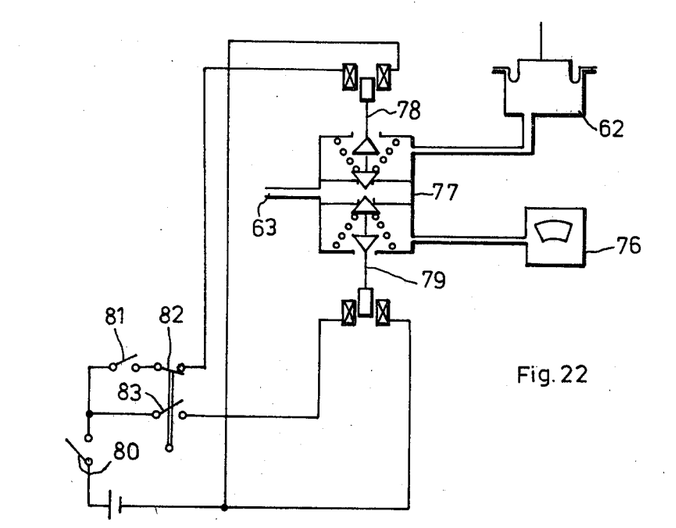
FIG. 22 shows another embodiment of the present invention having a pair of electromechanical pneumatic switches.

FIG. 22 shows an active electrical triggering of the pneumatic switches. Housing 77 accommodates electromagnetically operated pneumatic valves 78 and 79, which, when energized, convey the intake suctions from line 63 to servo motor 62, and/or consumption indicator 76. When in a no current condition, they connect to the atmosphere. When the manual switch 80 (on-off switch) is closed the electromagnetic valve 78 is switched when switch 81 is closed (gas pedal travel more than approximately 10%) and switch 82 is closed, indicating the transmission is not in the highest speed. This connects servo motor 62 to the intake pressure source 63. If the driver is not feeding enough gas, switch 81 opens, supplying air to servo motor 62. If the driver shifts to the highest gear, switch 82 is opened supplying air to servo motor 62, and closing switch 83 which switches the intake pressure to the consumption indicator 76. The advantages of the arrangement of FIG. 22 are the electrical actuation, and failsafe shut off in the no-current condition.

Figure 23:
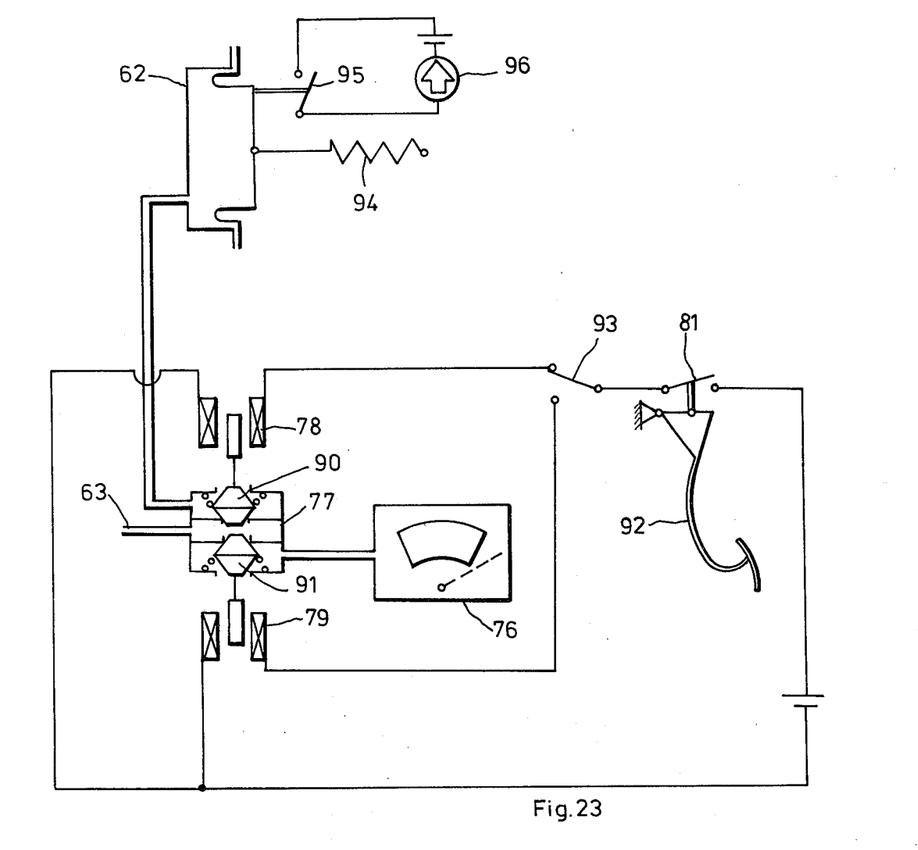
FIG. 23 shows another embodiment of the present invention having a pair of electromechanical pneumatic switches.

FIG. 23 shows a refinement of the device according to FIG. 22. Like parts in the two figures have the same reference numerals. Intake suction 63 acts on the middle chamber of housing 77, which is closed in the first instance by spring action through the double cones 90 and 91 of electromagnetic valves 78 and 79. If the gas pedal 92 departs from its idling position shown, switch 81 closes, energizing valve 78 by way of switch 93, which replaces switches 82 and 83 in the FIG. 22 device.

The double cone 90 transmits the intake suction from tube 63 to the negative pressure chamber 62. If it amounts to more than about 3 meters of water, the force of spring 94, which may be in communication with the throttle, is overcome, closing switch 95 which activates the signal generator 96. The signal output prompts a driver to up-shift. If the driver feeds more gas, the negative pressure 63 decreases and signal is shut off. If he slacks off on the gas pedal, switch 81 opens and the double cone 90 supplies air to the negative pressure chamber 62. Signal 96 is shutt off, for example, downhill or brake mode. In top gear switch 93 is brought into the lower illustrated position by the transmission. With gas pedal 92 actuated, magnetic valve 79 moves double cone 91 downward, so that the intake suction line 63 is connected to the consumption indicator 76. In that case there is a one-to-one relationship between intake suction and consumption in liters per 100 kilometers permitting direct calibration of a pressure gage. The indicator 76 and meter 96 may advantageously be integrated into one unit.

While there have been described what I believe to be the preferred embodiments of the present invention, those skilled in the art will recognize that other and further changes may be made thereto without departing from the spirit of the invention and it is intended to claim all such embodiments as fall within the true scope of the invention.

I claim:

1. A method for operating an internal combustion engine speed having an adjustable fuel proportioning device and having variable power output and variable rotational speed, to avoid operation at engine speeds and output powers corresponding to high fuel consumption, consisting of the steps of selecting a value of maximum speed for each value of engine output power, said selected values corresponding to greater speed than the value for maximum power output at selected fuel consumption, monitoring the output power and the rotational speed of said engine, and adjusting said fuel proportioning means to increase engine output only when said engine speed is greater than the selected value for the actual output power of the engine.

2. A method according to claim 1 wherein said engine is controlled by an operator and wherein said adjusting step includes signaling said operator when said speed is greater than said selected value.

3. A method according to claim 1 wherein said adjusting step is performed automatically by a control mechanism.

4. A method according to any of claims 1 to 3 wherein said engine is connected to a load by a multi-speed transmission, further including the step of changing said transmission to a higher speed when said engine speed is greater than said selected value.

5. Apparatus for use in controlling operation of an internal combustion engine having an adjustable fuel proportioning device and having variable output power and variable rotational speed to avoid operation at engine speeds and output powers corresponding to high fuel consumption by adjusting said fuel proportioning means to increase engine output power when engine speed is greater than a predetermined value of engine speed for the current output power of the engine, comprising:

means for sensing at least one engine characteristic representative of at least one operating parameter selected from the group consisting of engine output power and negative pressure in an intake manifold which supplies a fuel/air mixture to said engine;

control means, responsive to the output of said sensing means, for providing an output only when said speed is greater than a selected value of maximum speed for the current output power of the engine, said selected value of maximum speed being greater than the engine speed value for maximum power output at a given fuel level; and output means, responsive to said control means output, for causing adjustment of said fuel proportioning means.

6. Apparatus as specified in claim 5, wherein said internal combustion engine comprises a gasoline engine having a carburetor connected to an intake manifold for supplying a fuel/air mixture to said engine, and wherein said characteristic representative of a least one operating parameter comprises the negative pressure in said intake manifold, and wherein said predetermined value of engine speed is related to said intake manifold vacuum.

7. Apparatus according to claim 6 wherein said sensing means comprises a passage connected to said intake manifold, wherein said control means comprises a negative pressure chamber connected to said passage and having a first spring resisting the movement of a wall of said chamber and wherein said control means comprises an electrical switch communicating with said movable wall and operative upon movement of said wall and a current source for providing said output when said switch is closed, and wherein said output means includes signaling means responsive to the closing of said switch.

8. Apparatus according to claim 7 wherein said spring is integrated with the movable wall of the negative pressure chamber.

9. Apparatus according to claim 7 wherein said first spring is within said negative pressure chamber.

10. Apparatus according to any of claims 7 through 9 wherein the movable wall of the negative pressure chamber is acted upon by a second spring whose tension depends on the adjustment of the fuel proportioning means.

11. Apparatus according to claim 10 wherein said second spring acts against said first spring, and wherein the tension of said second spring is greater when the fuel proportioning means is adjusted in the direction of full load.

12. Apparatus according to claim 11 wherein there is provided a lever arranged between said switch and said movable wall of said negative pressure chamber, and wherein said lever is acted on by said second spring.

13. Apparatus according to claim 1 wherein there is provided a servo motor, actuated by said negative pressure in said intake manifold and wherein said servo motor is operatively connected with said fuel proportioning means and is provided within a vent valve which opens when said engine is idling.

14. Apparatus according to claim 13 wherein there is provided a negative pressure line between said servo motor and said intake manifold, wherein there is provided an electromagnetic valve in said line, and wherein said valve is opened upon actuation of said switch to connect said servo motor to said intake manifold.

15. Apparatus according to claim 5, for controlling operation of an internal combustion engine including a fuel injection pump, wherein said pump includes a control bar, wherein said predetermined values correspond to a constant setting of said control bar.

16. Apparatus according to claim 15 wherein said constant setting corresponds to approximately 80 percent of the maximum available fuel injection quantity per pump stroke.

17. Apparatus according to claim 16 wherein there is provided a switch for operating a signaling device in operative connection with a lever constituting the control means and connected to said control bar and a gas pedal.

18. Apparatus as specified in claim 5, for controlling operation of an internal combustion engine connected to a multiple speed transmission, and including a switch for disconnecting said output means when said transmission is in its highest gear.

19. Apparatus as specified in claim 14, wherein said electromagnetic valve has an additional excitation circuit for closing said valve upon reaching a preassigned rotational speed of said engine.

20. Apparatus according to claim 5 wherein said predetermined value of engine speed comprises an approximately constant value of rotational speed for all output powers of said engine, wherein said means for sensing comprises means for sensing engine rotational speed, and wherein said control means comprises a switch which closes upon the attainment of said speed thereby to close a circuit, and wherein there is provided an additional switch, operative upon the attainment of a selected throttle control position, for opening said circuit.

21. Apparatus as specified in claim 5 wherein there are provided second control means responsive to the attainment of engine rotational speeds having second lower values than said predetermined values and having lower values than the values corresponding to maximum output power at a predetermined fuel consumption, and responsive to an operating characteristic of the engine, and second output means responsive to said second control means for causing an output signal when said rotational speed is less than said second values.

22. Apparatus according to claim 21 wherein said second output means comprises an indicating instrument.

23. Apparatus according to claim 5 wherein said preassigned values of engine speed determine pairs of values for throttle flap setting and intake duct vacuum.

24. Apparatus according to claim 5, for use in connection with an engine having a transmission with multiple speeds, and further including an indicating instrument for giving an indication of fuel consumption, and a switching device for connecting said indicating instrument to the intake manifold of the engine when the transmission is in its highest gear.

25. Apparatus according to claim 24 further including an electromagnetic valve system, a switch activated when the gas pedal is in its idling position, a control switch actuated when the highest gear of the transmission is engaged, said control means and said switches being arranged so that the electromagnetic valves connect the fuel consumption indicator to the intake manifold when the highest gear is engaged and connect a negative pressure chamber actuating a throttle control to the intake duct when the highest gear is not engaged, the negative pressure chamber operating a switch for indicating the desirability of a change in transmission gear at a preassigned intake manifold vacuum.

* * * * *

UNITED STATES PATENT AND TRADEMARK OFFICE
CERTIFICATE OF CORRECTION

PATENT NO. : 4,385,604
DATED : May 31, 1983
INVENTOR(S) : Ernst Fiala

It is certified that error appears in the above-identified patent and that said Letters Patent is hereby corrected as shown below:

Column 10, line 54, "claim 1" should read --any one of claims 7 to 9--.

Signed and Sealed this

Twenty-second Day of May 1984

[SEAL]

Attest:

GERALD J. MOSSINGHOFF

Attesting Officer

Commissioner of Patents and Trademarks